United States Patent
Mizoguchi et al.

(10) Patent No.: US 12,117,943 B2
(45) Date of Patent: Oct. 15, 2024

(54) ELECTRONIC CONTROL DEVICE

(71) Applicant: HITACHI ASTEMO, LTD., Hitachinaka (JP)

(72) Inventors: Masashi Mizoguchi, Tokyo (JP); Tomohito Ebina, Hitachinaka (JP); Tasuku Ishigooka, Tokyo (JP); Kazuyoshi Serizawa, Hitachinaka (JP); Kenichi Osada, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/254,451

(22) PCT Filed: Sep. 9, 2021

(86) PCT No.: PCT/JP2021/033207
§ 371 (c)(1),
(2) Date: May 25, 2023

(87) PCT Pub. No.: WO2022/137665
PCT Pub. Date: Jun. 30, 2022

(65) Prior Publication Data
US 2024/0020245 A1    Jan. 18, 2024

(30) Foreign Application Priority Data

Dec. 23, 2020  (JP) ................ 2020-214322

(51) Int. Cl.
G06F 13/10  (2006.01)
(52) U.S. Cl.
CPC ........ G06F 13/102 (2013.01); *G06F 2213/40* (2013.01)

(58) Field of Classification Search
None
See application file for complete search history.

(56) References Cited

U.S. PATENT DOCUMENTS

2023/0227052 A1* 7/2023 Wu ................ B60W 50/0205
701/1

FOREIGN PATENT DOCUMENTS

| JP | 2006-039768 A | 2/2006 |
|----|---|---|
| JP | 2011-138401 A | 7/2011 |

(Continued)

OTHER PUBLICATIONS

International Search Report with English Translation and Written Opinion of International Patent Application No. PCT/JP2021/033207 dated Nov. 30, 2021 (8 pages).

*Primary Examiner* — Scott C Sun
(74) *Attorney, Agent, or Firm* — Foley & Lardner LLP

(57) ABSTRACT

An object of the present invention is to provide a technology that enables second control software to continue processing using a peripheral circuit even in a situation where an abnormality related to first control software occurs. An electronic control device includes a memory (3) that stores the first control software and the second control software, a CPU (1) that executes the first control software and the second control software, and a peripheral circuit (200) used by the first control software and the second control software. The memory further includes a first buffer (313a) and a second buffer (323a). The CPU interrupts at least one of the processing of storing first peripheral transmission information in the first buffer and the processing of transmitting the first peripheral transmission information to the peripheral in a specific situation in which the abnormality related to the first control software occurs.

11 Claims, 17 Drawing Sheets

(56) References Cited

FOREIGN PATENT DOCUMENTS

| | | |
|---|---|---|
| JP | 2012-198806 A | 10/2012 |
| JP | 2018-100091 A | 6/2018 |

* cited by examiner

FIG. 3

| MEMORY AREA | READ RIGHT | WRITE RIGHT |
|---|---|---|
| STORAGE AREA OF MAIN OS | | |
| STORAGE AREA OF FIRST SUB OS | ALLOWED | ALLOWED |
| STORAGE AREA OF SECOND SUB OS | | |
| STORAGE AREA OF FIRST CONTROL SOFTWARE | ALLOWED | ALLOWED |
| STORAGE AREA OF SECOND CONTROL SOFTWARE | | |
| STORAGE AREA OF CAN DRIVER | | |
| STORAGE AREA OF FIRST GPIO PIN DRIVER | ALLOWED | ALLOWED |
| STORAGE AREA OF FIRST VIRTUAL CAN DRIVER | ALLOWED | ALLOWED |
| STORAGE AREA OF SECOND GPIO PIN DRIVER | | |
| STORAGE AREA OF SECOND VIRTUAL CAN DRIVER | | |
| STORAGE AREA OF CONTROL TASK | | |

FIG. 4

| MEMORY AREA | READ RIGHT | WRITE RIGHT |
|---|---|---|
| STORAGE AREA OF MAIN OS | | |
| STORAGE AREA OF FIRST SUB OS | | |
| STORAGE AREA OF SECOND SUB OS | ALLOWED | ALLOWED |
| STORAGE AREA OF FIRST CONTROL SOFTWARE | | |
| STORAGE AREA OF SECOND CONTROL SOFTWARE | ALLOWED | ALLOWED |
| STORAGE AREA OF CAN DRIVER | | |
| STORAGE AREA OF FIRST GPIO PIN DRIVER | | |
| STORAGE AREA OF FIRST VIRTUAL CAN DRIVER | | |
| STORAGE AREA OF SECOND GPIO PIN DRIVER | ALLOWED | ALLOWED |
| STORAGE AREA OF SECOND VIRTUAL CAN DRIVER | ALLOWED | ALLOWED |
| STORAGE AREA OF CONTROL TASK | | |

FIG. 14

| DIAGNOSIS TARGET | STATE |
|---|---|
| MAIN CPU CORE | NORMAL |
| FIRST CPU CORE | NORMAL |
| SECOND CPU CORE | NORMAL |
| CAN CONTROLLER | NORMAL |
| FIRST GPIO PIN | NORMAL |
| SECOND GPIO PIN | NORMAL |
| FIRST ACCESSIBLE AREA | NORMAL |
| SECOND ACCESSIBLE AREA | NORMAL |
| FIRST CONTROL SOFTWARE | ABNORMAL |
| SECOND CONTROL SOFTWARE | NORMAL |

FIG. 15

| TARGET IN WHICH ABNORMALITY OCCURS | INITIALIZATION POLICY |
|---|---|
| MAIN CPU CORE | OVERALL INITIALIZATION PROCESSING |
| CAN CONTROLLER | OVERALL INITIALIZATION PROCESSING |
| FIRST CPU CORE | FIRST INITIALIZATION PROCESSING |
| FIRST GPIO PIN | FIRST INITIALIZATION PROCESSING |
| FIRST ACCESSIBLE AREA | FIRST INITIALIZATION PROCESSING |
| FIRST CONTROL SOFTWARE | FIRST INITIALIZATION PROCESSING |
| FIRST VIRTUAL CAN DRIVER | FIRST INITIALIZATION PROCESSING |
| SECOND CPU CORE | SECOND INITIALIZATION PROCESSING |
| SECOND GPIO PIN | SECOND INITIALIZATION PROCESSING |
| SECOND ACCESSIBLE AREA | SECOND INITIALIZATION PROCESSING |
| SECOND CONTROL SOFTWARE | SECOND INITIALIZATION PROCESSING |
| SECOND VIRTUAL CAN DRIVER | SECOND INITIALIZATION PROCESSING |

FIG. 16

|  | OVERALL INITIALIZATION PROCESSING | FIRST INITIALIZATION PROCESSING | SECOND INITIALIZATION PROCESSING |
| --- | --- | --- | --- |
| MAIN CPU CORE | ○ | | |
| FIRST CPU CORE | ○ | ○ | |
| SECOND CPU CORE | ○ | | ○ |
| CAN CONTROLLER | ○ | | |
| FIRST VIRTUAL CAN DRIVER (FIRST BUFFER) | ○ | ○ | |
| SECOND VIRTUAL CAN DRIVER (SECOND BUFFER) | ○ | | ○ |
| FIRST GPIO PIN DRIVER | ○ | ○ | |
| SECOND GPIO PIN DRIVER | ○ | | ○ |
| FIRST ACCESSIBLE AREA | ○ | ○ | |
| SECOND ACCESSIBLE AREA | ○ | | ○ |
| FIRST CONTROL SOFTWARE | ○ | ○ | |
| SECOND CONTROL SOFTWARE | ○ | | ○ |

ELECTRONIC CONTROL DEVICE

TECHNICAL FIELD

The present invention relates to an electronic control device.

BACKGROUND ART

A microcomputer includes a central processing unit (CPU), a memory, a peripheral, and the like. The peripheral includes one or more peripheral circuits to provide various functions to the microcomputer. PTL 1 discloses a device that restarts a peripheral when the peripheral is in an abnormal state.

CITATION LIST

Patent Literature

PTL 1: JP 2011-138401 A

SUMMARY OF INVENTION

Technical Problem

Conventionally, a microcomputer equipped with a plurality of control software is known. From the viewpoint of size, cost, and the like, the number of peripheral circuits mounted on the microcomputer is limited. Therefore, a plurality of pieces of control software may share one peripheral circuit.

In the above configuration, it is assumed that an abnormality related to one (hereinafter, referred to as "first control software") of a plurality of pieces of control software has occurred. Even in such a situation, the other (hereinafter, referred to as "second control software") of the plurality of control software is required to continue the processing using the peripheral circuit. The device described in PTL 1 restarts a peripheral circuit. In such a configuration, the second control software cannot use the peripheral circuit until the restart of the peripheral circuit is completed. Therefore, there is a problem that the second control software cannot continue the processing.

Therefore, the present disclosure provides a technology that enables the second control software to continue processing using a peripheral circuit even in a situation where an abnormality related to the first control software occurs.

Solution to Problem

In one or more embodiments, the following electronic control device is provided. The electronic control device includes: a memory storing first control software and second control software; a CPU that executes the first control software and the second control software; and a peripheral circuit used by the first control software and the second control software. The memory further includes a first buffer and a second buffer. The CPU is configured to execute: first storage processing of storing first peripheral transmission information in the first buffer, the first peripheral transmission information being transmission information from the first control software to the peripheral circuit; second storage processing of storing second peripheral transmission information in the second buffer, the second peripheral transmission information being transmission information from the second control software to the peripheral circuit; and first output processing of outputting the first peripheral transmission information from the first buffer to the peripheral circuit; and second output processing of outputting the second peripheral transmission information from the second buffer to the peripheral circuit. The CPU is configured to interrupt at least one of the first storage processing or the first output processing in a specific situation where an abnormality related to the first control software has occurred, and continue the second storage processing and the second output processing.

Advantageous Effects of Invention

According to the above configuration, the electronic control device can continue the processing related to the second control software (the second storage processing and the second output processing) even in a specific situation where an abnormality related to the first control software occurs. Other features of the invention will be clear from the description and the accompanying drawings. In addition, objects, configurations, and effects besides the above description will be apparent through the explanation on the following embodiments.

BRIEF DESCRIPTION OF DRAWINGS

FIG. 3 is an example of setting information regarding a first accessible area in a first MPU.

FIG. 4 is an example of setting information regarding a second accessible area in a second MPU.

FIG. 14 is an example of a diagnosis information table.

FIG. 15 is an example of an initialization policy table.

FIG. 16 is an example of an initialization range table.

DESCRIPTION OF EMBODIMENTS

Hereinafter, embodiments will be described with reference to the accompanying drawings. The accompanying drawings illustrate specific examples, but are not intended to be used to interpret the technical scope of the present invention in a limited manner.

The following embodiments each relate to an electronic control device on which a plurality of control software is mounted. In order to simplify the description, an embodiment of an electronic control device equipped with two pieces of control software (first control software and second control software) will be described. However, the configuration of the electronic control device is not limited thereto, and the electronic control device may further include other control software (for example, third control software and fourth control software).

First Embodiment (Overall Configuration)

Figure 1:
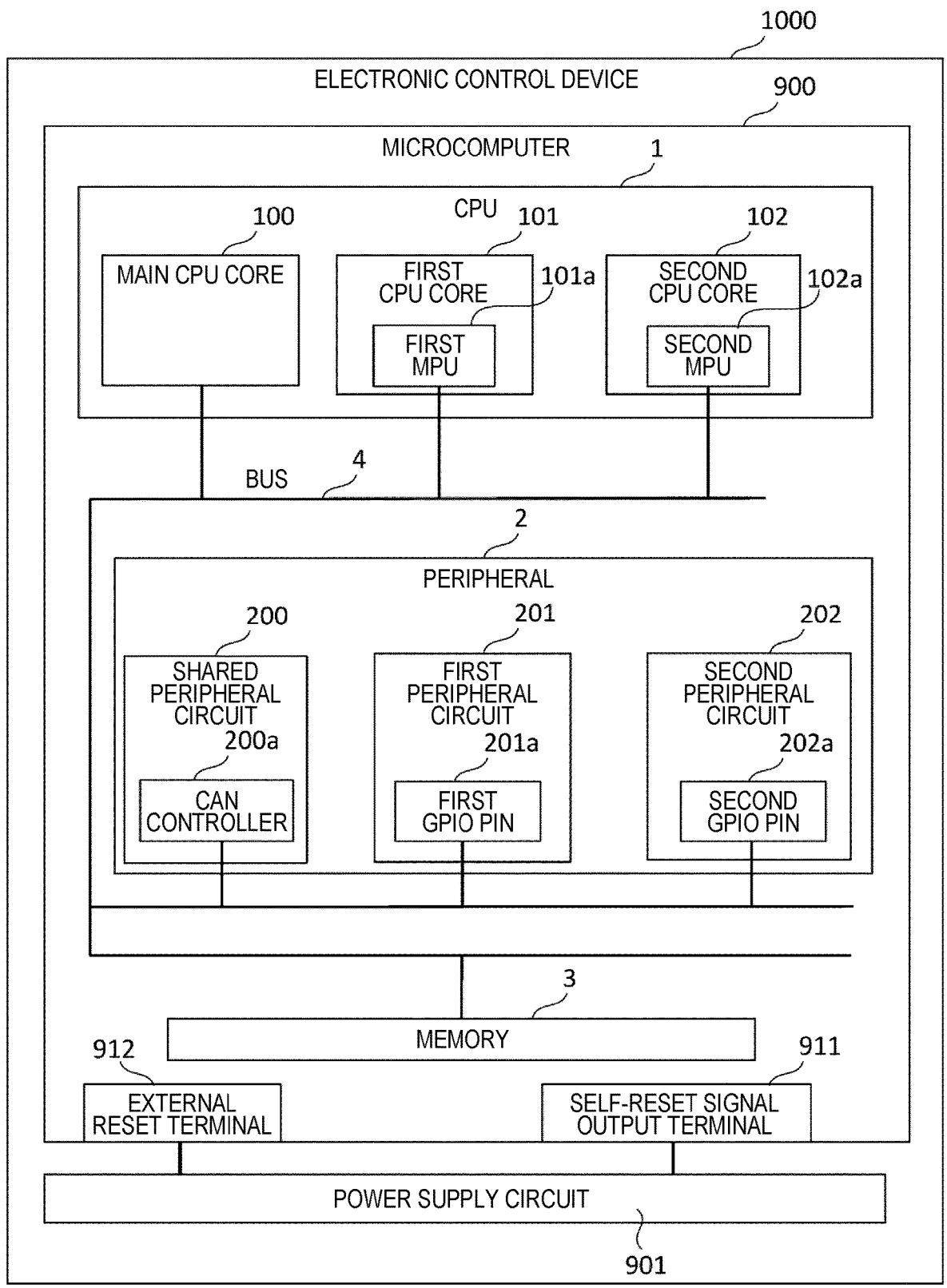
FIG. 1 is a diagram illustrating a hardware configuration of an electronic control device.

FIG. 1 is a diagram illustrating a hardware configuration of an electronic control device. An electronic control device 1000 includes a microcomputer 900 and a power supply circuit 901. The microcomputer 900 includes a CPU 1, a peripheral 2, a memory 3, and a bus 4. The CPU 1, the peripheral 2, and the memory 3 are connected to each other via the bus 4. Therefore, the CPU 1 can access the peripheral 2 and the memory 3 via the bus 4.

The memory 3 stores a plurality of pieces of software. The CPU 1 executes software stored in the memory 3.

The microcomputer 900 further includes a self-reset signal output terminal 911 and an external reset terminal 912. Each of the self-reset signal output terminal 911 and the external reset terminal 912 is connected to the power supply circuit 901. The microcomputer 900 outputs a reset request signal to the power supply circuit 901 via the self-reset signal output terminal 911. The power supply circuit 901 inputs an external reset signal to the external reset terminal 912 in response to the reset request signal. When the microcomputer 900 receives the external reset signal, the microcomputer 900 is restarted.

(CPU)

The CPU 1 includes a plurality of cores. Specifically, the CPU 1 includes a main CPU core 100, a first CPU core 101, and a second CPU core 102.

The first CPU core 101 includes a first memory protection unit (MPU) 101a. The first MPU 101a includes setting information related to an area (hereinafter, referred to as a "first accessible area") of the memory 3 accessible by the first CPU core 101. The first MPU 101a allows the first CPU core 101 to access the first accessible area. The first MPU 101a prohibits the first CPU core 101 from accessing an area other than the first accessible area.

The second CPU core 102 includes a second MPU 102a. The second MPU 102a includes setting information related to an area (hereinafter, referred to as a "second accessible area") of the memory 3 accessible by the second CPU core 102. The second MPU 102a allows the second CPU core 102 to access the second accessible area. The second MPU 102a prohibits the second CPU core 102 from accessing an area other than the second accessible area.

Figure 2:
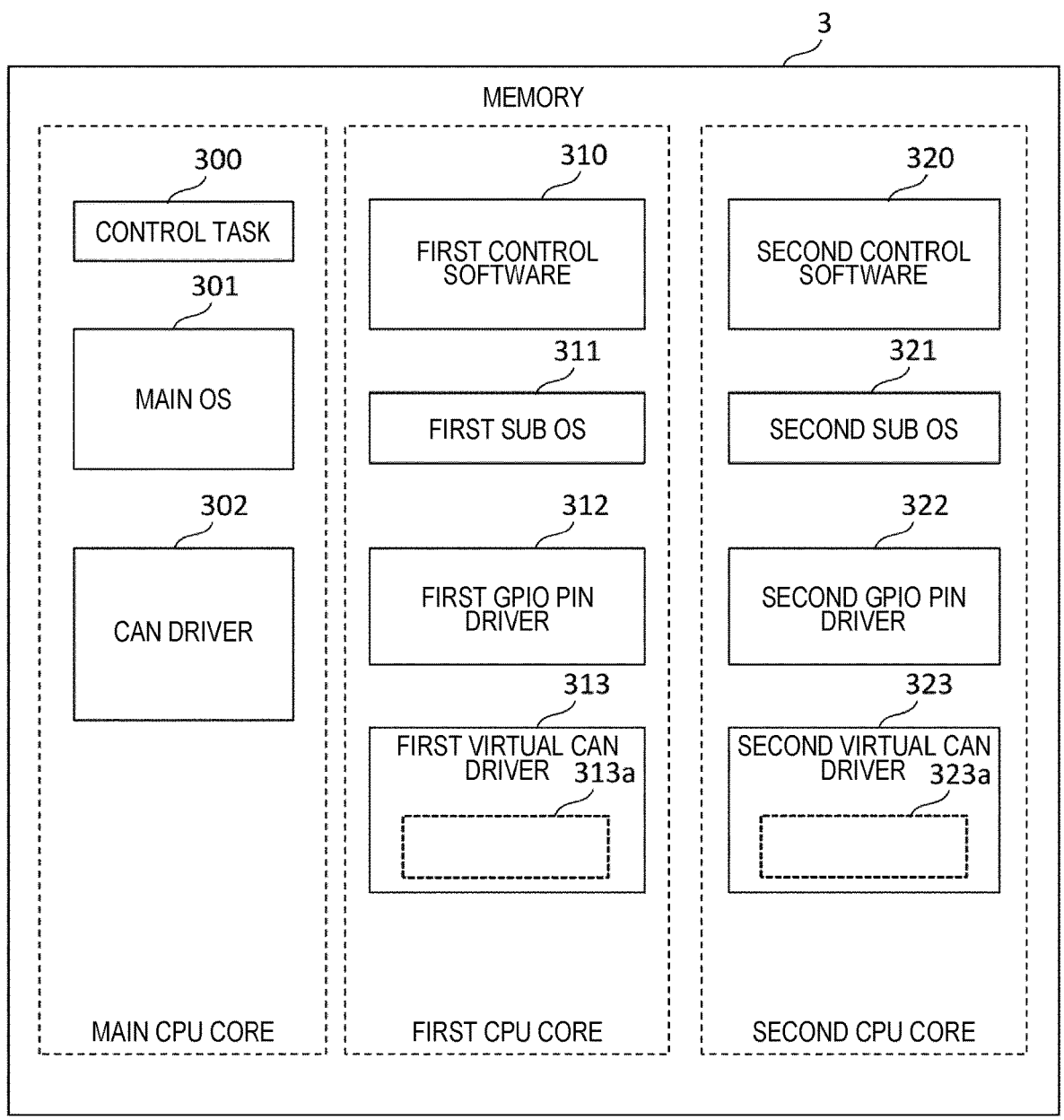
FIG. 2 is a diagram illustrating an example of software stored in a memory.

The main CPU core 100 executes processing related to a main operating system (OS) 301 (see FIG. 2). The first CPU core 101 executes processing related to first control software 310 (see FIG. 2). The second CPU core 102 executes processing related to second control software 320 (see FIG. 2).

The CPU 1 is not limited to the above configuration. The CPU 1 may include four or more CPU cores. For example, the CPU 1 may include a plurality of first CPU cores 101. In this case, each of the plurality of first CPU cores 101 includes the first MPU 101a. For example, the CPU 1 may include a plurality of second CPU cores 102. In this case, each of the plurality of second CPU cores 102 includes the second MPU 102a.

(Peripheral)

The peripheral 2 includes a plurality of peripheral circuits. The peripheral circuit refers to a circuit other than the CPU 1 and the memory 3 among the components mounted on the microcomputer 900. Examples of the peripheral circuit include a controller area network (CAN) controller, an analog/digital converter (A/D converter), a direct memory access controller, and general purpose input/output (GPIO).

In the present example, the peripheral 2 includes a shared peripheral circuit 200, a first peripheral circuit 201, and a second peripheral circuit 202. The shared peripheral circuit 200 includes a CAN controller 200a. The first peripheral circuit 201 includes a first GPIO pin 201a for analog. The second peripheral circuit 202 includes a second GPIO pin 202a for digital.

The shared peripheral circuit 200 is a peripheral circuit used by both the first control software 310 (that is, the first CPU core 101) and the second control software 320 (that is, the second CPU core 102). Note that the shared peripheral circuit 200 is also accessed from the main CPU core 100.

The first peripheral circuit 201 is a peripheral circuit used only by the first control software 310 (that is, the first CPU core 101). The second peripheral circuit 202 is a peripheral circuit used only by the second control software 320 (that is, the second CPU core 102).

(Software)

FIG. 2 is a diagram illustrating software stored in the memory 3. The memory 3 stores a plurality of pieces of software. The memory 3 stores a control task 300, a main OS 301, and a CAN driver 302. The main CPU core 100 executes these pieces of software 300 to 302.

Each piece of software executed by the main CPU core 100 will be described. In the following description, the software 300 to 302 is described as a subject. However, since the main CPU core 100 executes the software 300 to 302, the subject may be replaced with the main CPU core 100.

The main OS 301 initializes the CAN driver 302. The CAN driver 302 is software corresponding to the shared peripheral circuit 200, and is software that outputs an operation command to the CAN controller 200a.

Further, the main OS 301 starts a first sub OS 311 and a second sub OS 321. That is, the main OS 301 transmits a start command of the first sub OS 311 to the first CPU core 101, and transmits a start command of the second sub OS 321 to the second CPU core 102.

Further, the main OS 301 starts the control task 300 at a cycle of 1 ms. In this example, the execution cycle of the control task 300 is 1 ms, but is not limited thereto. Detailed processing contents of the control task 300 will be described later.

The memory 3 further stores the first control software 310, the first sub OS 311, a first GPIO pin driver 312, and a first virtual CAN driver 313. The first CPU core 101 executes these pieces of software 310 to 313.

Each software executed by the first CPU core 101 will be described. In the following description, the software 310 to 313 is described as a subject. However, since the subject executing the software 310 to 313 is the first CPU core 101, the subject may be replaced with the first CPU core 101.

The first sub OS 311 initializes the first GPIO pin driver 312 according to a start command from the main OS 301. The first GPIO pin driver 312 is software that outputs an operation command to the first GPIO pin 201a.

The first sub OS 311 starts the first control software 310 according to a start command from the main OS 301. The first control software 310 includes one or more tasks. The task of the first control software 310 is executed by the first sub OS 311 at a predetermined timing. In the present example, the first control software 310 transmits first peripheral transmission information at a predetermined timing. The first peripheral transmission information is information transmitted to the CAN controller 200a.

Further, the first sub OS 311 initializes the first virtual CAN driver 313 according to a start command from the main OS 301. The first virtual CAN driver 313 is software interposed between the first control software 310 and the CAN driver 302, and is software that processes the first peripheral transmission information. Specifically, the first virtual CAN driver 313 includes a first buffer 313a. The first virtual CAN driver 313 stores the first peripheral transmission information in the first buffer 313a.

The memory 3 further stores the second control software 320, the second sub OS 321, a second GPIO pin driver 322, and a second virtual CAN driver 323. The second CPU core 102 executes these pieces of software 320 to 323.

Software executed by the second CPU core 102 will be described. In the following description, the software 320 to 323 is described as a subject. However, since the subject executing the software 320 to 323 is the second CPU core 102, the subject may be replaced with the second CPU core 102.

The second sub OS 321 initializes the second GPIO pin driver 322 according to a start command from the main OS 301. The second GPIO pin driver 322 is software that outputs an operation command to the second GPIO pin 202a.

The second sub OS 321 starts the second control software 320 according to a start command from the main OS 301. The second control software 320 includes one or more tasks. The task of the second control software 320 is executed by the second sub OS 321 at a predetermined timing. In the present example, the second control software 320 transmits second peripheral transmission information at a predetermined timing. The second peripheral transmission information is information transmitted to the CAN controller 200a.

Further, the second sub OS 321 initializes the second virtual CAN driver 323 according to a start command from the main OS 301. The second virtual CAN driver 323 is software interposed between the second control software 320 and the CAN driver 302, and is software that processes the second peripheral transmission information. Specifically, the second virtual CAN driver 323 includes a second buffer 323a. The second virtual CAN driver 323 stores the second peripheral transmission information in the second buffer 323a.

(Setting Information in First MPU)

FIG. 3 is a diagram illustrating setting information related to the first accessible area in the first MPU 101a. The first CPU core 101 has a read right and a write right to the storage areas of the software 310 to 313. The first CPU core 101 does not have a read right and a write right for an area other than the storage areas of the software 310 to 313. This can prevent the first control software 310 (that is, the first CPU core 101) from affecting the main OS 301 and the second control software 320.

(Setting Information in Second MPU)

FIG. 4 is a diagram illustrating setting information related to the second accessible area in the second MPU 102a. The second CPU core 102 has a read right and a write right to the storage areas of the software 320 to 323. The second CPU core 102 does not have the read right and the write right to the area other than the storage areas of the software 320 to 323. This can prevent the second control software 320 (that is, the second CPU core 102) from affecting the main OS 301 and the first control software 310.

Note that the main CPU core 100 can access the entire area of the memory 3.

(Connection Configuration with External Control Device)

Figure 5:
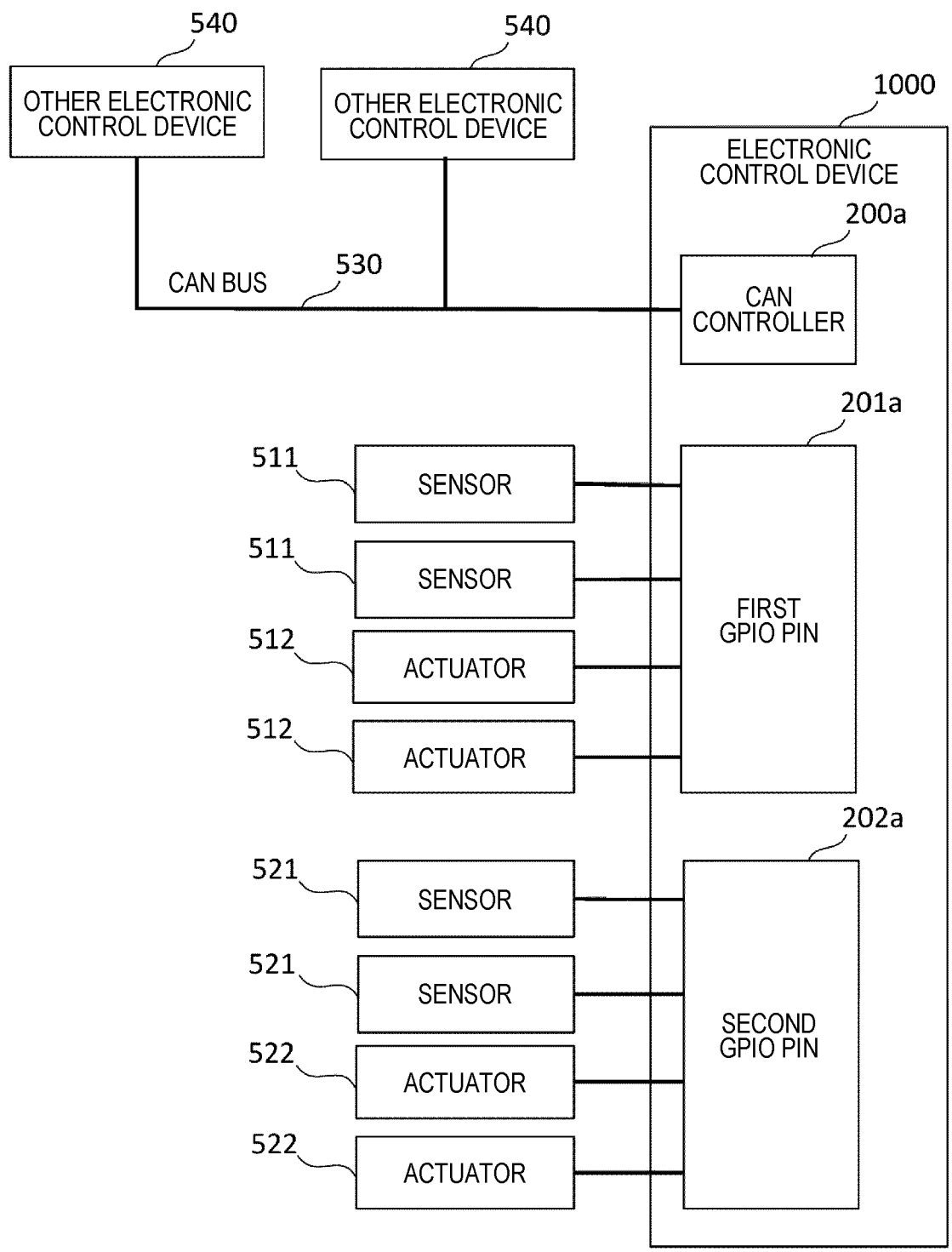
FIG. 5 is a diagram illustrating a connection relationship between an electronic control device and an external device.

FIG. 5 is a diagram illustrating a connection relationship between the electronic control device 1000 and an external device. Hereinafter, processing contents of the first control software 310 and the second control software 320 will be described.

First Control Software

The plurality of sensors 511 and the plurality of actuators 512 are disposed outside the electronic control device 1000. Each of the plurality of sensors 511 and the plurality of actuators 512 is connected to the first GPIO pin 201a.

The first control software 310 accesses the first GPIO pin 201a to input an analog signal to each of the plurality of actuators 512. Further, the first control software 310 receives an analog signal from each of the plurality of sensors 511 via the first GPIO pin 201a. The first control software 310 transmits the first peripheral transmission information based on these analog signals.

In the present example, the first peripheral transmission information is a CAN message transmitted from the first control software 310 to each of the other electronic control device 540. Note that the first peripheral transmission information is output to the CAN controller 200a via the first buffer 313a as described later. The CAN controller 200a receives the first peripheral transmission information. The CAN controller 200a converts the first peripheral transmission information into a physical signal, and transmits the physical signal to the other electronic control device 540 via a CAN bus 530.

Second Control Software

A plurality of sensors 521 and a plurality of actuators 522 are disposed outside the electronic control device 1000. Each of the plurality of sensors 521 and the plurality of actuators 522 is connected to the second GPIO pin 202a.

The second control software 320 accesses the second GPIO pin 202a to input a digital signal to each of the plurality of actuators 522. Further, the second control software 320 receives a digital signal from each of the plurality of sensors 521 via the second GPIO pin 202a. The second control software 320 transmits the second peripheral transmission information based on these digital signals.

In the present example, the second peripheral transmission information is a CAN message transmitted from the second control software 320 to each of the other electronic control device 540. Note that the second peripheral transmission information is output to the CAN controller 200a via the second buffer 323a as described later. The CAN controller 200a receives the second peripheral transmission information. The CAN controller 200a converts the second peripheral transmission information into a physical signal, and transmits the physical signal to the other electronic control device 540 via CAN bus 530.

(Operations of CAN Driver and CAN Controller)

Figure 6:
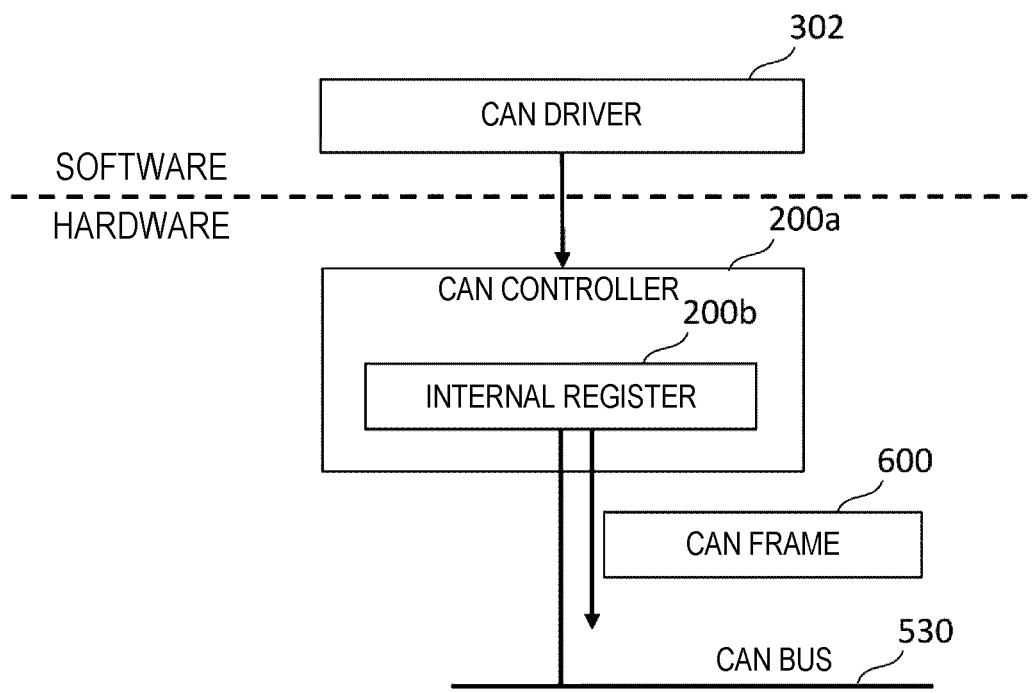
FIG. 6 is a diagram for explaining an operation of a CAN driver and an operation of a CAN controller.

FIG. 6 is a diagram illustrating an outline of an operation of the CAN driver 302 and an operation of the CAN controller 200a. Hereinafter, a case where the first control software 310 transmits the first peripheral transmission information will be described. The CAN driver 302 stores the first peripheral transmission information in a predetermined place of an internal register 200b of the CAN controller 200a. The CAN controller 200a stores the first peripheral transmission information in a CAN frame 600 according to a predetermined CAN protocol. The CAN controller 200a then converts the CAN frame 600 into a physical signal and transmits the physical signal to the CAN bus 530.

Note that, also in a case where the second control software 320 transmits the second peripheral transmission information, the CAN driver 302 and the CAN controller 200a operate in the same manner as described above.

(Operation of Software)

Figure 7:
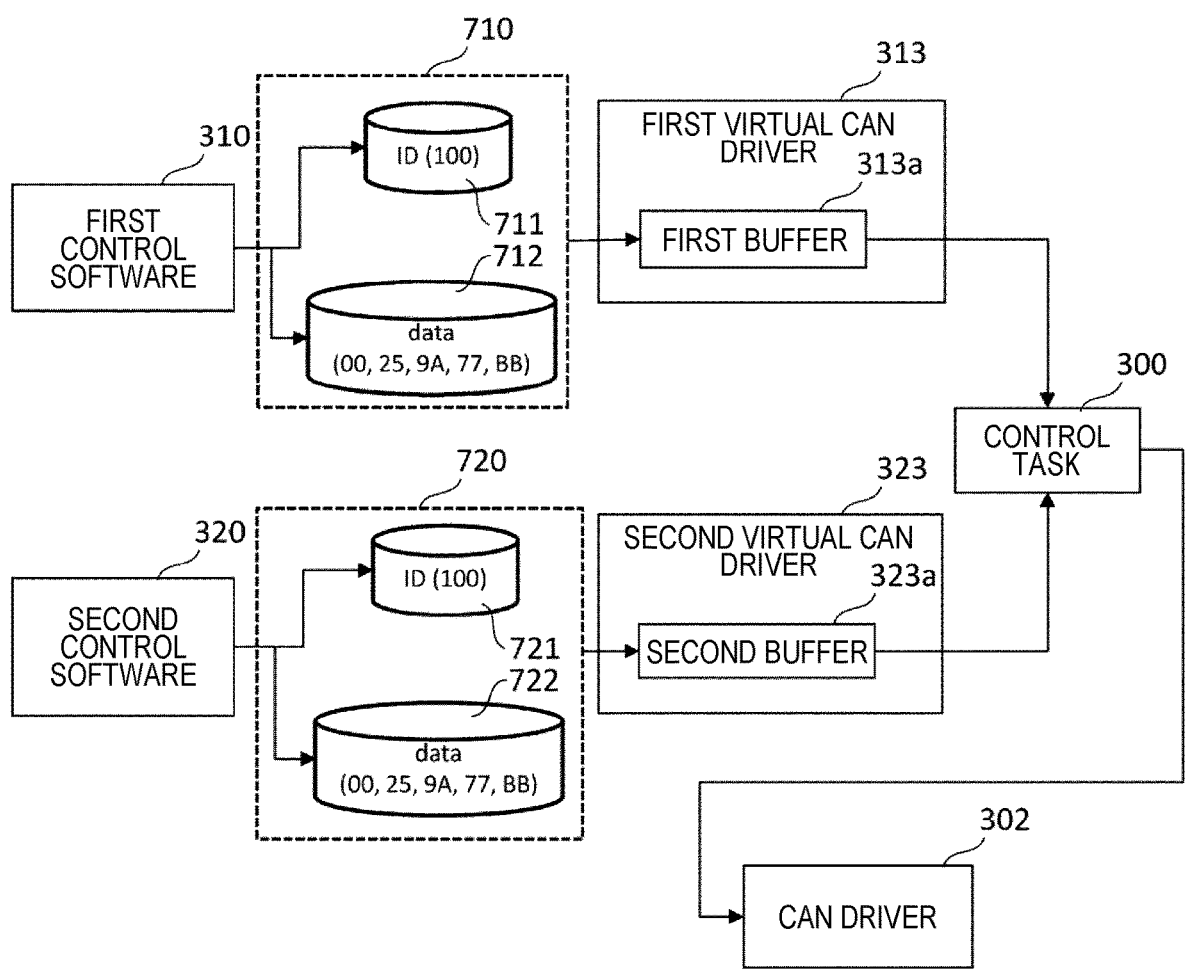
FIG. 7 is a diagram illustrating an example of an input/output relationship among a plurality of pieces of software.

FIG. 7 is a diagram illustrating an input/output relationship among a plurality of pieces of software. According to this example, there are two virtual CAN drivers (that is, the first virtual CAN driver 313 and the second virtual CAN driver 323) in the front stage of the CAN driver 302. The first control software 310 and the second control software 320 use the first virtual CAN driver 313 and the second virtual CAN driver 323, respectively. The control task 300 alternately accesses the first virtual CAN driver 313 and the second virtual CAN driver 323, and alternately outputs first peripheral transmission information 710 and second peripheral transmission information 720 to the CAN driver 302. As a result, it is possible to use one CAN driver 302 while separating the processing of the first control software 310 and the processing of the second control software 320.

Specifically, the first control software 310 transmits the first peripheral transmission information 710 to the first virtual CAN driver 313. The first virtual CAN driver 313 stores the first peripheral transmission information 710 in the first buffer 313a.

The second control software 320 transmits the second peripheral transmission information 720 to the second virtual CAN driver 323. The second virtual CAN driver 323 stores the second peripheral transmission information 720 in the second buffer 323a.

The control task 300 extracts the first peripheral transmission information 710 from the first buffer 313a, and outputs the first peripheral transmission information 710 to the CAN driver 302.

The control task 300 extracts the second peripheral transmission information 720 from the second buffer 323a, and outputs the second peripheral transmission information 720 to the CAN driver 302.

Hereinafter, specific processing contents of the various software illustrated in FIG. 7 will be described.

First Control Software

Figure 8:
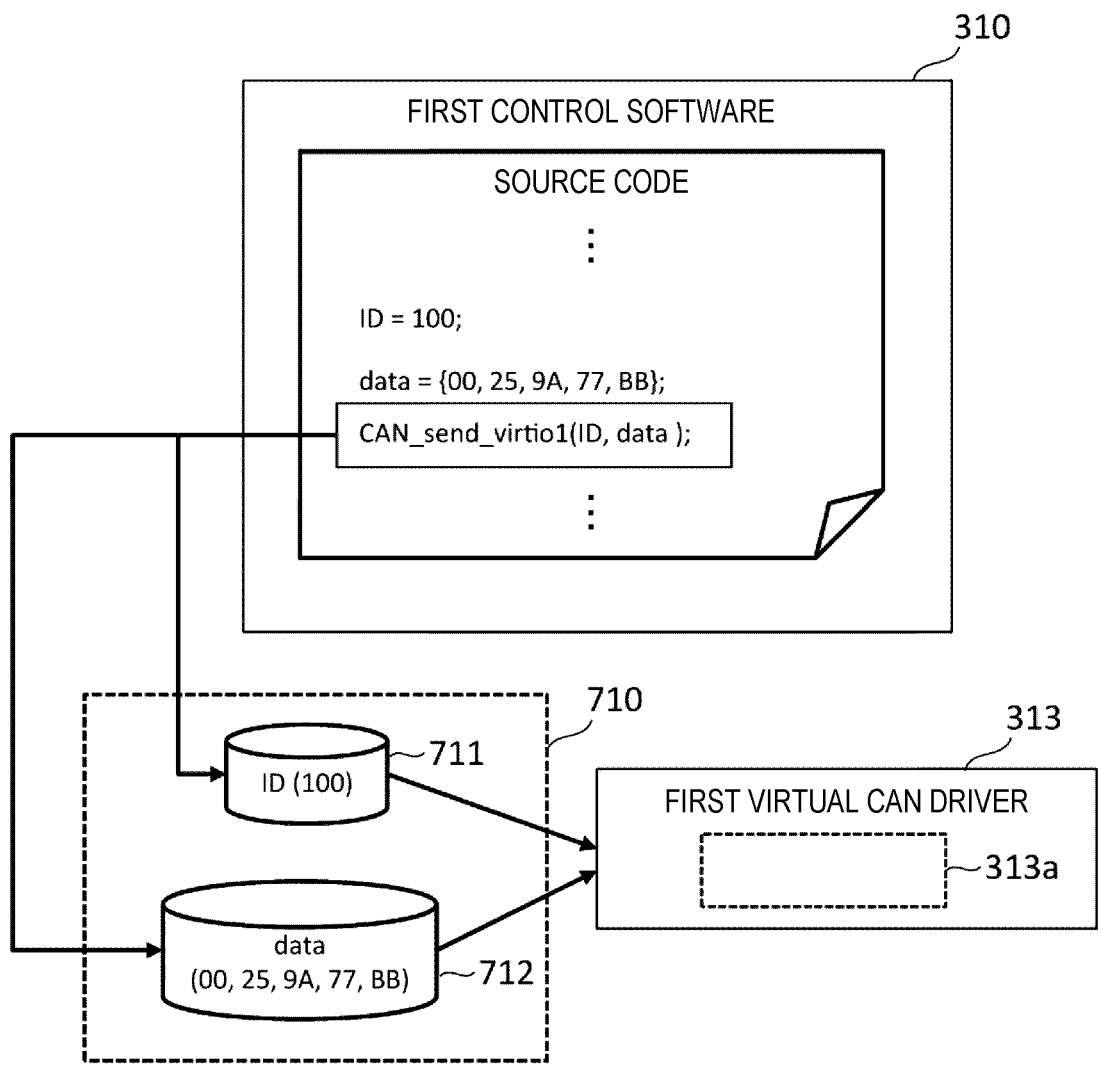
FIG. 8 is a diagram for explaining a flow of processing in a case where first control software transmits first peripheral transmission information.

FIG. 8 is a diagram for explaining a flow of processing in a case where the first control software 310 transmits the first peripheral transmission information 710. The first control software 310 designates a CAN message ID and data as the first peripheral transmission information 710. The first control software 310 calls CAN_send_virtio1 (ID, data). CAN_send_virtio1 (ID, data) is a command to send the first peripheral transmission information 710 to the first virtual CAN driver 313. The first peripheral transmission information 710 includes a CAN message ID 711 and data 712.

First Virtual CAN Driver

When the first control software 310 calls CAN_send_virtio1 (ID, data), the first virtual CAN driver 313 receives the first peripheral transmission information 710. The first virtual CAN driver 313 stores the first peripheral transmission information 710 in the first buffer 313a.

Second Control Software

The same applies to a case where the second control software 320 transmits the second peripheral transmission information 720. The second control software 320 designates a CAN message ID and data as the second peripheral transmission information 720. The second control software 320 calls CAN_send_virtio2 (ID, data). CAN_send_virtio2 (ID, data) is a command for transmitting the second peripheral transmission information 720 to the second virtual CAN driver 323. As illustrated in FIG. 7, the second peripheral transmission information 720 includes a CAN message ID 721 and data 722.

Second Virtual CAN Driver

When the second control software 320 calls CAN_send_virtio2 (ID, data), the second virtual CAN driver 323 receives the second peripheral transmission information 720. The second virtual CAN driver 323 stores the second peripheral transmission information 720 in the second buffer 323a.

First Buffer

Figure 9:
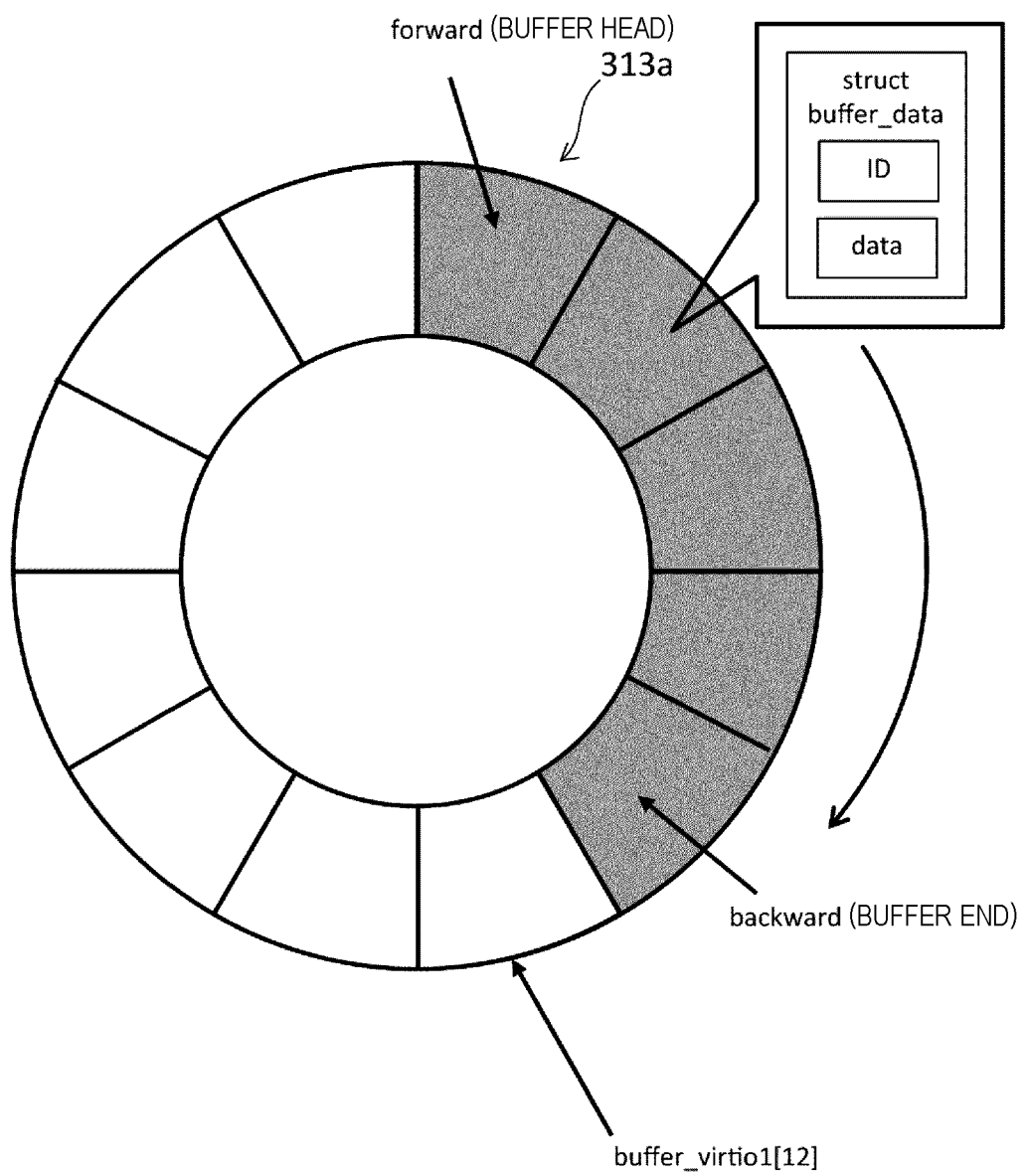
FIG. 9 is a diagram illustrating an example of a data structure of a first buffer.

FIG. 9 is a diagram illustrating a data structure of the first buffer 313a. The first buffer 313a has a ring buffer structure that is one of the implementations of the First-In-First-Out queue. Each element of the first buffer 313a is a structure including a set of a CAN message ID and data. The entity of the ring buffer is a structure array buffer_virtio1[12]. Here, for convenience of description, the number of elements of the array is 12, but the number of elements is not limited thereto.

When the first control software 310 calls CAN_send_virtio1 (ID, data), the first virtual CAN driver 313 computes an index backward representing the buffer end position as follows (backward←(backward+1) % 12). Here, "%" is an operator for obtaining a remainder when (backward+1) is divided by 12. Note that when the index backward is an array termination (backward=11), the first virtual CAN driver 313 substitutes "0" for backward. The first virtual CAN driver 313 stores the first peripheral transmission information 710 in buffer_virtio1[backward]. In this manner, the first virtual CAN driver 313 stores the first peripheral transmission information 710 at the end of the first buffer 313a. Hereinafter, such storage processing of the first peripheral transmission information 710 is referred to as "first storage processing".

Second Buffer

Figure 10:
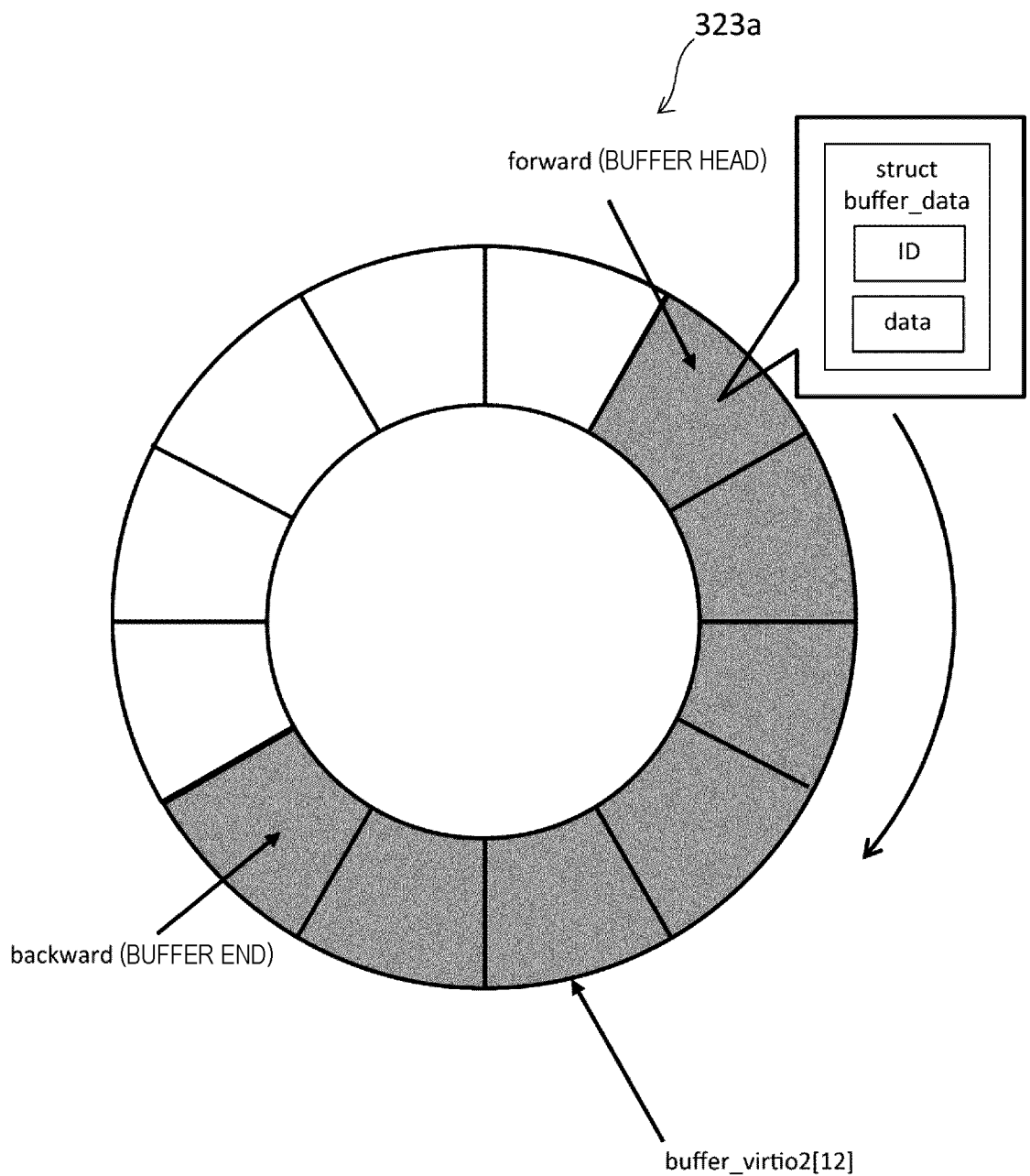
FIG. 10 is a diagram illustrating an example of a data structure of a second buffer.

FIG. 10 is a diagram illustrating a data structure of the second buffer 323a. The second buffer 323a has a ring buffer structure that is one of the implementations of the First-In-First-Out queue. Each element of the second buffer 323a is a structure including a set of a CAN message ID and data. The entity of the ring buffer is a structure array buffer_virtio2[12]. Here, for convenience of description, the number of elements of the array is 12, but the number of elements is not limited thereto.

When the second control software 320 calls CAN_send_virtio2 (ID, data), the second virtual CAN driver 323 computes the index backward representing the buffer end position as follows (backward←(backward+1) % 12). Note that when the index backward is an array termination (backward=11), the second virtual CAN driver 323 substitutes "0" for backward. The second virtual CAN driver 323 stores the second peripheral transmission information 720 in buffer_virtio2[backward]. In this manner, the second virtual CAN driver 323 stores the second peripheral transmission information 720 at the end of the second buffer 323a. Hereinafter, such storage processing of the second peripheral transmission information 720 is referred to as "second storage processing".

Control Task

The control task 300 retrieves the first peripheral transmission information 710 from the first buffer 313a. As illustrated in FIG. 9, the control task 300 extracts data buffer_virtio1[forward] included in an index forward indicating the buffer head position as the first peripheral transmission information 710. Then, the control task 300 computes the index forward as follows (forward←(forward+1) % 12). When the index forward is the array termination (forward=11), the control task 300 substitutes "0" for the index forward. The control task 300 outputs the first peripheral transmission information 710 to the CAN driver 302. Hereinafter, such output processing of the first peripheral transmission information 710 is referred to as "first output processing".

The control task 300 retrieves the second peripheral transmission information 720 from the second buffer 323a. As illustrated in FIG. 10, the control task 300 extracts data buffer_virtio2[forward] included in the index forward indicating the buffer head position as the second peripheral transmission information 720. Then, the control task 300 computes the index forward as follows (forward←(forward+ 1) % 12). When the index forward is the array termination (forward=11), the control task 300 substitutes "0" for the index forward. The control task 300 outputs the second peripheral transmission information 720 to the CAN driver 302. Hereinafter, such output processing of the second peripheral transmission information 720 is referred to as "second output processing".

Figure 11:
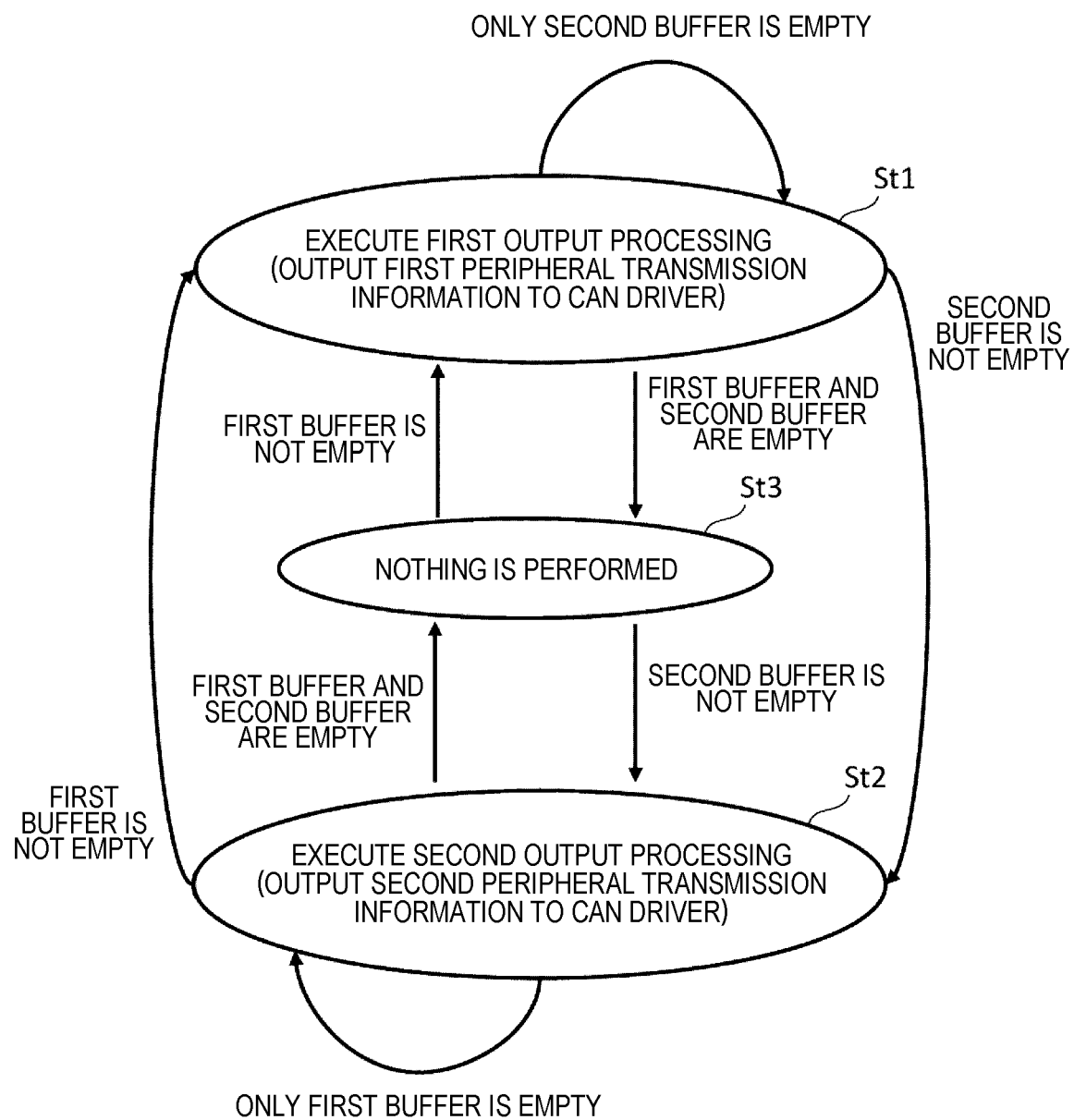
FIG. 11 is a state transition diagram held inside a control task.

FIG. 11 is a state transition diagram held in the control task 300. As described above, the control task 300 is a task started by the main OS 301 at a cycle of 1 ms. The control task 300 alternately executes the first output processing and the second output processing.

For example, it is assumed that the control task 300 is in a first state St1. In this case, the control task 300 executes the first output processing.

After executing the first output processing, the control task 300 determines whether the second buffer 323a is empty. When the second buffer 323a is not empty, the control task 300 transitions from the first state St1 to a second state St2. On the other hand, when the second buffer 323a is empty and the first buffer 313a is not empty (that is, in a case where only the second buffer 323a is empty), the control task 300 maintains the first state St1. In this case, the control task 300 repeatedly executes the first output processing.

When both the first buffer 313a and the second buffer 323a are empty after the control task 300 executes the first output processing, the control task 300 transitions from the first state St1 to a third state St3. In this case, the control task 300 does not perform any operation. Thereafter, when the first buffer 313a is not empty (that is, in a case where the first peripheral transmission information 710 is stored in the first buffer 313a), the control task 300 transitions from the third state St3 to the first state St1. Alternatively, when the second buffer 323a is not empty (that is, in a case where the second peripheral transmission information 720 is stored in the second buffer 323a), the control task 300 transitions from the third state St3 to the second state St2.

It is assumed that the control task 300 has transitioned from the first state St1 to the second state St2. In this case, the control task 300 executes the second output processing.

After executing the second output processing, the control task 300 determines whether the first buffer 313a is empty. When the first buffer 313a is not empty, the control task 300 transitions from the second state St2 to the first state St1. On the other hand, when the first buffer 313a is empty and the second buffer 323a is not empty (that is, in a case where only the first buffer 313a is empty), the control task 300 maintains the second state St2. In this case, the control task 300 repeatedly executes the second output processing.

When both the first buffer 313a and the second buffer 323a are empty after the control task 300 executes the second output processing, the control task 300 transitions from the first state St1 to the third state St3. In this case, the control task 300 does not perform any operation. Thereafter, when the first buffer 313a is not empty (that is, in a case where the first peripheral transmission information 710 is stored in the first buffer 313a), the control task 300 transitions from the third state St3 to the first state St1. Alternatively, when the second buffer 323a is not empty (that is, in a case where the second peripheral transmission information 720 is stored in the second buffer 323a), the control task 300 transitions from the third state St3 to the second state St2.

Features of the Present Embodiment

In the electronic control device 1000, an abnormality related to the first control software 310 may occur. Hereinafter, such a situation is referred to as a "specific situation". The specific situation includes, for example, a situation in which an abnormality has occurred in the first control software 310 and a situation in which an abnormality has occurred in software and hardware related to the first control software 310.

In the present example, the specific situation means a situation in which at least one of the following (1) to (3) occurs.

(1) The first control software 310 executes processing other than normal processing (so-called exception handling). Here, the normal processing is transmission processing of the first peripheral transmission information 710. The exception handling includes, for example, access to an area other than the first accessible area (out-of-area access), processing regarding a deadline miss, and the like.

(2) An abnormality has occurred in software (for example, the first GPIO pin driver 312) associated with the first control software 310.

(3) An abnormality has occurred in the hardware associated with the first control software 310. Examples of such hardware include (a) the CPU 1 and the memory 3, (b) the sensor 511 and the actuator 522 connected to the first GPIO pin 201a, and (c) the shared peripheral circuit 200 that is a transmission destination of the first peripheral transmission information 710.

The first control software 310 transmits a first interruption command to the first virtual CAN driver 313 in a specific situation. The first interruption command includes a command to suspend the first storage processing and a command to initialize the first buffer 313a. The first virtual CAN driver 313 interrupts (prohibits) the first storage processing in response to the first interruption command. Further, the first virtual CAN driver 313 initializes the first buffer 313a according to the first interruption command (that is, the first buffer 313a is emptied). The first virtual CAN driver 313 can initialize the first buffer 313a by substituting the index forward indicating the buffer head position into the index backward indicating the buffer end position.

In this manner, the first virtual CAN driver 313 interrupts the first storage processing and initializes the first buffer 313a in response to the first interruption command. Since the first buffer 313a is empty, the control task 300 maintains the second state St2 (see FIG. 11). Stated another way, the control task 300 interrupts the first output processing. On the other hand, the control task 300 continues the second storage processing and the second output processing.

According to the present embodiment, two virtual CAN drivers 313 and 323 exist in front of the CAN driver 302. The first control software 310 and the second control software 320 use the first virtual CAN driver 313 and the second virtual CAN driver 323, respectively. The control task 300 alternately accesses the first virtual CAN driver 313 and the second virtual CAN driver 323, and alternately outputs first peripheral transmission information 710 and second peripheral transmission information 720 to the CAN driver 302. In this way, the processing of the first control software 310 and the processing of the second control software 320 are separated. Therefore, even in the specific situation where the abnormality related to the first control software 310 has occurred, the second control software 320 can continue the second storage processing and the second output processing. That is, the second control software 320 can continue the transmission of the second peripheral transmission information 720 to the CAN controller 200a.

Further, in a specific situation, an inappropriate first peripheral transmission information 710 may be output to the CAN driver 302. Since the first virtual CAN driver 313 initializes the first buffer 313a, the above-described problem can be prevented from occurring.

In the present example, the first CPU core 101 executes processing related to the first control software 310, and the second CPU core 102 executes processing related to the second control software 320. Therefore, the two CPU cores 101 and 102 can continue processing independently of each other. It is possible to prevent processing executed by one CPU core from affecting processing executed by the other CPU core.

Note that similar processing is executed even in a case where an abnormality related to the second control software 320 occurs. The second control software 320 transmits a second interruption command to the second virtual CAN driver 323. The second interruption command includes a command to interrupt the second storage processing and a command to initialize the second buffer 323a. The second virtual CAN driver 323 interrupts (prohibits) the second storage processing in response to the second interruption command. Further, the second virtual CAN driver 323 initializes the second buffer 323a. The second virtual CAN driver 323 can initialize the second buffer 323a by substituting the index forward indicating the buffer head position into the index backward indicating the buffer end position.

Second Embodiment

Figure 12:
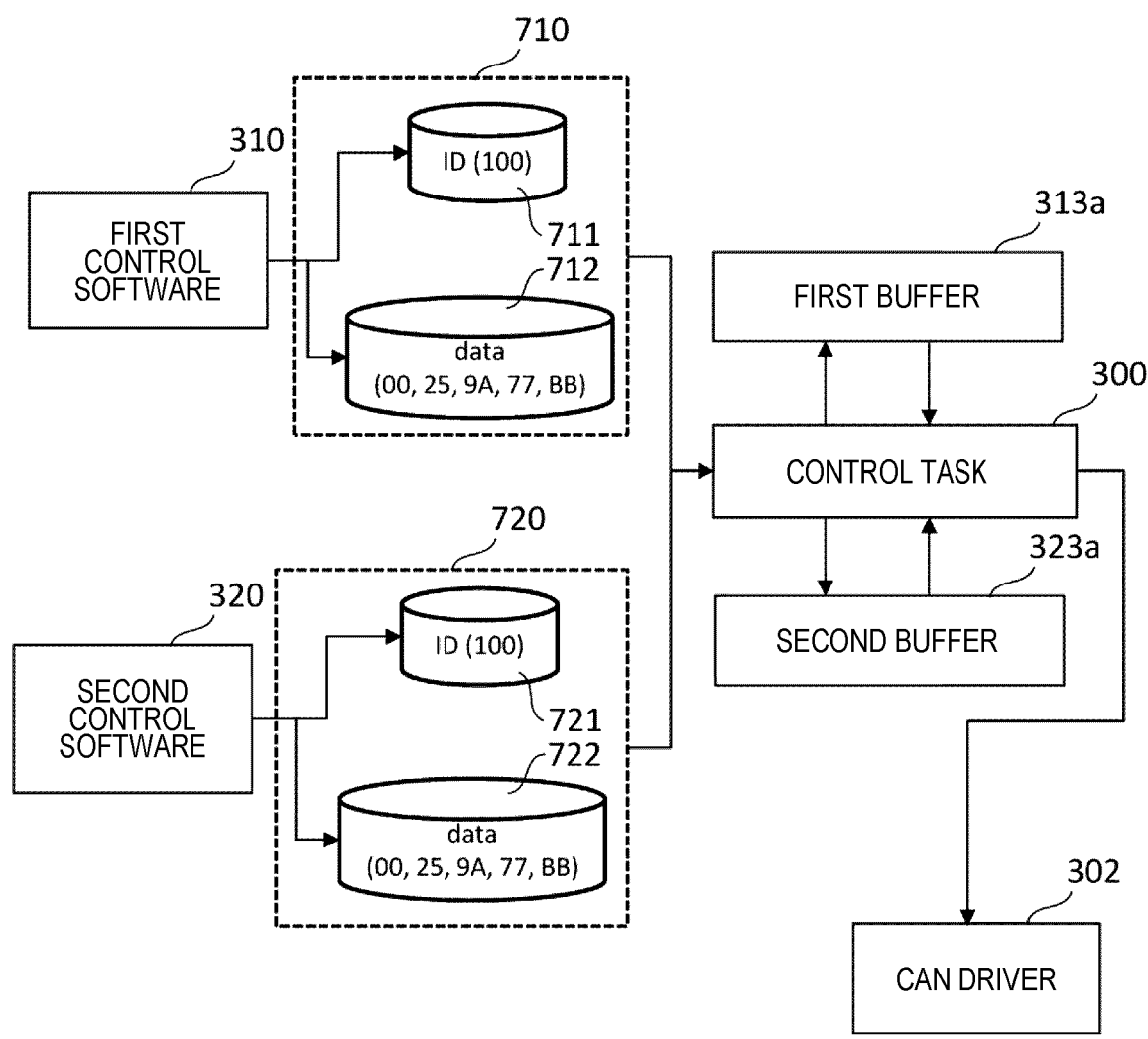
FIG. 12 is a diagram illustrating another example of an input/output relationship among a plurality of pieces of software.

A configuration of the electronic control device 1000 in a second embodiment will be described. Hereinafter, differences from the first embodiment will be mainly described. FIG. 12 is a diagram illustrating an input/output relationship between a plurality of pieces of software in the present example. The control task 300 is configured to execute all of the first storage processing, the second storage processing, the first output processing, and the second output processing.

The control task 300 receives the first peripheral transmission information 710 from the first control software 310 and executes the first storage processing. Further, the control task 300 receives the second peripheral transmission information 720 from the second control software 320 and executes the second storage processing.

The control task 300 executes the first output processing and the second output processing according to the state transition diagram of FIG. 11.

The first control software 310 transmits a third interruption command to the control task 300 in the specific situation. The third interruption command includes only a command to interrupt the first storage processing. The control task 300 interrupts the first storage processing in response to the third interruption command. The control task 300 continues the first output processing until the first buffer 313a is empty. When the first buffer 313a becomes empty, the control task 300 interrupts the first output processing. On the other hand, the control task 300 continues the second storage processing and the second output processing.

According to the above configuration, the second control software 320 can continue the second storage processing and the second output processing even in the specific situation.

In another example, the third interruption command includes only a command to interrupt the first output processing. The control task 300 interrupts the first output processing in response to the third interruption command. The control task 300 may continue only the first storage processing. The control task 300 may continue the first storage processing until all the elements of the array of the first buffer 313a are filled. When all the elements of the array of the first buffer 313a are filled, the control task 300 interrupts the first storage processing. On the other hand, the control task 300 continues the second storage processing and the second output processing.

In yet another example, the control task 300 may interrupt both the first storage processing and the first output processing in a specific situation. Therefore, the first peripheral transmission information 710 in the first buffer 313a is held.

Third Embodiment

Figure 13:
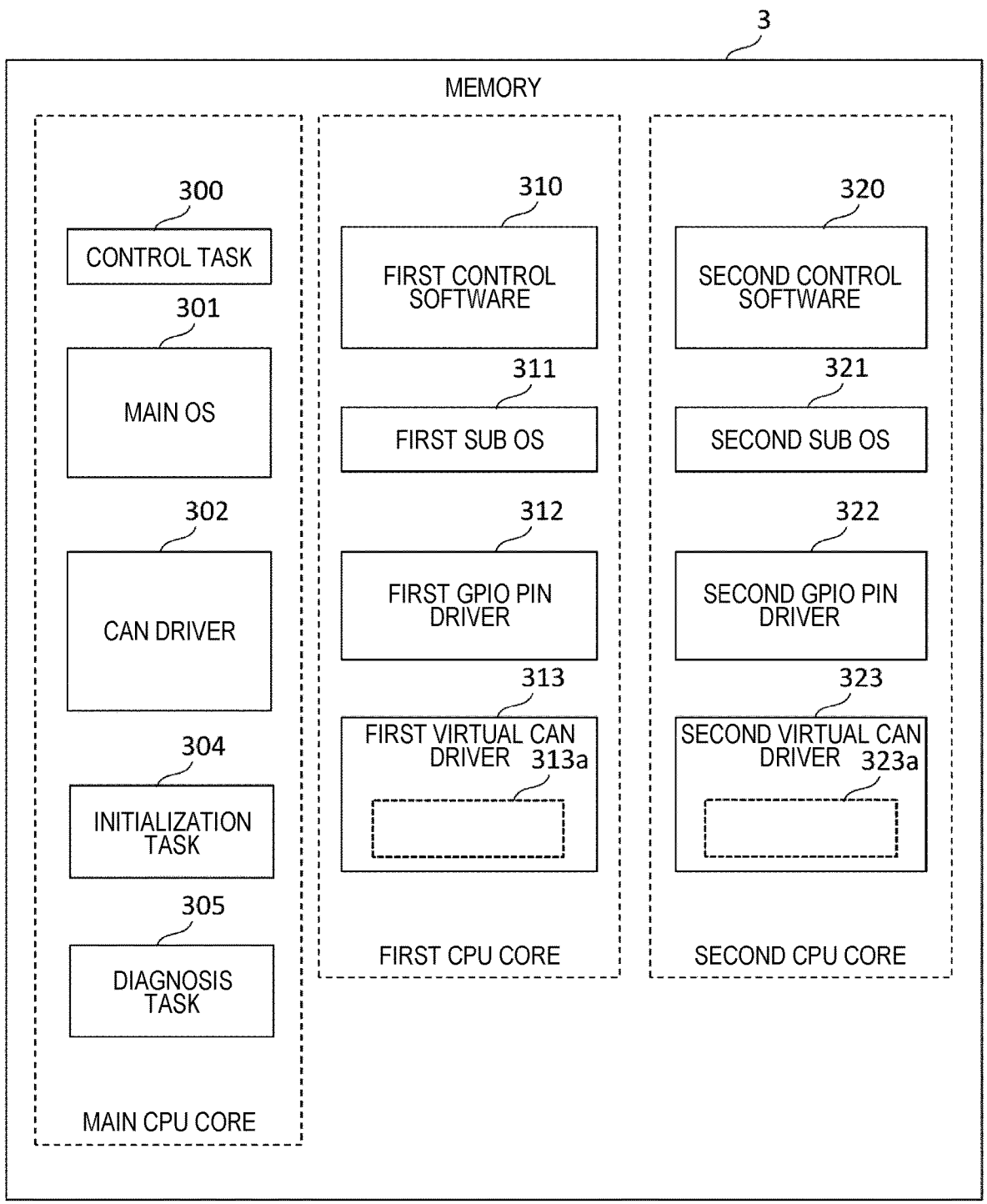
FIG. 13 is a diagram illustrating another example of software stored in a memory.

A configuration of the electronic control device 1000 in a third embodiment will be described. Hereinafter, differences from the first embodiment will be mainly described. As illustrated in FIG. 13, in the present example, the memory 3 further stores an initialization task 304 and a diagnosis task 305. The main CPU core 100 further executes the software 304 and 305. The same configurations as those of the first embodiment are denoted by the same reference numerals as those of the first embodiment, and the description thereof will be omitted.

The main OS 301 initializes the CAN driver 302. The main OS 301 starts the control task 300 and the initialization task 304 at a cycle of 1 ms. In this example, the execution cycle of the control task 300 and the initialization task 304 is 1 ms, but is not limited thereto.

Further, the main OS 301 activates the diagnosis task 305 at a cycle of 10 ms. In this example, the execution cycle of the diagnosis task 305 is 10 ms, but is not limited thereto.

(Diagnosis Information Table)

FIG. 14 is an example of a diagnosis information table 1400 generated by the diagnosis task 305. The diagnosis information table 1400 includes a diagnosis target 1401 and state 1402 as configuration items. The diagnosis target 1401 is hardware or software to be diagnosed. The state 1402 is information indicating whether the diagnosis target 1401 is in a normal state or an abnormal state.

The diagnosis task 305 monitors whether each of the diagnosis targets 1401 in the diagnosis information table 1400 is normally operating at a cycle of 10 ms. Accordingly, the diagnosis task 305 updates the state 1402 of the diagnosis information table 1400.

For example, the diagnosis task 305 confirms whether the hardware of the electronic control device 1000 is operating normally. The hardware here includes a main CPU core 100, a first CPU core 101, a second CPU core 102, a CAN controller 200a, a first GPIO pin 201a, and a second GPIO pin 202a.

Further, the diagnosis task 305 checks whether a memory error has occurred in the first accessible area (the area of the memory 3 that can be accessed by the first CPU core 101) and the second accessible area (the area of the memory 3 that can be accessed by the second CPU core 102). The memory error may be detected by a method such as parity check and cyclic redundancy check (CRC), or may be detected by other methods.

The diagnosis task 305 checks whether the first control software 310 is operating normally. The diagnosis task 305 may determine that an abnormality has occurred in the first control software 310 when the first control software 310 is performing exception handling. Further, the diagnosis task 305 checks whether the second control software 320 is operating normally.

When it is determined that the diagnosis target 1401 is operating normally, the diagnosis task 305 sets the corresponding state 1402 to "normal". When it is determined that an abnormality has occurred in the diagnosis target 1401, the diagnosis task 305 sets the corresponding state 1402 to "abnormal". As a result, the initialization task 304 can confirm whether each of the diagnosis targets 1401 is normally operating by referring to the diagnosis information table 1400.

The diagnosis information table 1400 is not limited to the above example. The diagnosis task 305 may check whether the first sub OS 311 and the second sub OS 321 are operating normally.

FIG. 15 illustrates an example of an initialization policy table 1500 held by the initialization task 304. The initialization policy table 1500 includes a target 1501 in which an abnormality occurs and an initialization policy 1502 as configuration items. The initialization policy 1502 represents which initialization processing is executed. In the present example, the initialization processing includes overall initialization processing, first initialization processing, and second initialization processing.

The initialization task 304 refers to the diagnosis information table 1400 to determine whether an abnormality has occurred in the diagnosis target 1401. When an abnormality occurs in the diagnosis target 1401, the initialization task 304 refers to the initialization policy table 1500 to acquire the initialization policy 1502 corresponding to the diagnosis target (that is, the target 1501 in which the abnormality occurs). The initialization task 304 executes initialization processing according to the acquired initialization policy 1502.

When an abnormality occurs in the main CPU core 100, the initialization task 304 executes the overall initialization processing. Further, when an abnormality occurs in the CAN controller 200a, the initialization task 304 executes the overall initialization processing.

On the other hand, when an abnormality occurs in the "hardware and software 1510 related to the first CPU core 101", the initialization task 304 executes the first initialization processing.

Further, when an abnormality occurs in the "hardware and software 1520 related to the second CPU core 102", the initialization task 304 executes the second initialization processing.

FIG. 16 is an example of an initialization range table 1600 held by the initialization task 304. The initialization range table 1600 indicates which hardware and software are initialized by each initialization processing.

The overall initialization processing is a process of initializing all hardware and software. The initialization task 304 executes the overall initialization processing as follows. The initialization task 304 outputs a reset request signal to the power supply circuit 901 via the self-reset signal output terminal 911. The power supply circuit 901 inputs an external reset signal to the external reset terminal 912 in response to the reset request signal. When the microcomputer 900 receives the external reset signal, the microcomputer 900 is restarted. In this manner, all the hardware and software on the microcomputer 900 are initialized.

The first initialization processing is a process of initializing hardware and software related to the first CPU core 101. The initialization task 304 executes the first initialization processing as follows. The initialization task 304 restarts the first CPU core 101. Further, the initialization task 304 restarts the first sub OS 311. Thereafter, the initialization task 304 transmits a predetermined start command to the first sub OS 311. The first sub OS 311 initializes the first GPIO pin driver 312 according to the start command from the initialization task 304. Further, the first sub OS 311 initializes the first virtual CAN driver 313. As a result, the first buffer 313a becomes empty. Further, the first sub OS 311 restarts the first control software 310. Further, the first sub OS 311 initializes the first accessible area.

The second initialization processing is a process of initializing hardware and software related to the second CPU core 102. The initialization task 304 executes the second initialization processing as follows. The initialization task 304 restarts the second CPU core 102. Further, the initialization task 304 restarts the second sub OS 321. Thereafter, the initialization task 304 transmits a predetermined start command to the second sub OS 321. The second sub OS 321 initializes the second GPIO pin driver 322 according to the start command from the initialization task 304. Further, the second sub OS 321 initializes the second virtual CAN driver 323. As a result, the second buffer 323a becomes empty. Further, the second sub OS 321 restarts the second control software 320. Further, the second sub OS 321 initializes the second accessible area.

As described above, the initialization task 304 changes the hardware and software to be initialized according to the hardware and software in which the abnormality occurs. For example, when an abnormality occurs in the hardware and software 1510 (see FIG. 15) related to the first CPU core 101, the initialization task 304 executes the first initialization processing. The initialization task 304 may initialize only the hardware and software 1510 associated with the first CPU core 101. While the first initialization processing is being executed, the first storage processing and the first output processing are interrupted. On the other hand, while the first initialization processing is executed, the second virtual CAN driver 323 continues the second storage processing, and the control task 300 continues the second output processing. Therefore, the second control software 320 can continue the transmission of the second peripheral transmission information 720 to the CAN controller 200a.

When an abnormality occurs in the hardware and software 1520 (see FIG. 15) related to the second CPU core 102, the initialization task 304 executes the second initialization processing. The initialization task 304 may initialize only the hardware and software 1520 associated with the second CPU core 102. While the second initialization processing is being executed, the second storage processing and the second output processing are interrupted. On the other hand, while the second initialization processing is executed, the first virtual CAN driver 313 continues the first storage processing, and the control task 300 continues the first output processing. Therefore, the first control software 310 can continue the transmission of the first peripheral transmission information 710 to the CAN controller 200a.

Fourth Embodiment

A configuration of the electronic control device 1000 in a fourth embodiment will be described. Hereinafter, differences from the third embodiment will be mainly described. The memory 3 includes an area for managing a first initialization processing flag and an area for managing a second initialization processing flag.

The first initialization processing flag is managed in the first accessible area. The first initialization processing flag takes either a value of True or False. The first initialization processing flag is a value of True in a period in which the first initialization processing is executed. The first initialization processing flag is a value of False in a period in which the first initialization processing is not executed.

When the first initialization processing flag is False, the first virtual CAN driver 313 executes first storage processing, and the control task 300 executes first output processing. The initialization task 304 sets the first initialization processing flag to True when starting the first initialization processing. Therefore, the first virtual CAN driver 313 interrupts the first storage processing, and the control task 300 interrupts the first output processing. The initialization task 304 sets the first initialization processing flag to False when the first initialization processing is completed. Therefore, the first virtual CAN driver 313 restarts the first storage processing, and the control task 300 restarts the first output processing. According to the above configuration, the first storage processing and the first output processing can be restarted according to the completion of the first initialization processing.

The second initialization processing flag is managed in the second accessible area. The second initialization processing flag takes either a value of True or False. The second initialization processing flag is a value of True in a period in which the second initialization processing is executed. The second initialization processing flag has a value of False in a period in which the second initialization processing is not executed.

When the second initialization processing flag is False, the second virtual CAN driver 323 executes second storage processing, and the control task 300 executes second output processing. The initialization task 304 sets the second initialization processing flag to True when starting the second initialization processing. Therefore, the second virtual CAN driver 323 interrupts the second storage processing, and the control task 300 interrupts the second output processing. The initialization task 304 sets the second initialization processing flag to False when the second initialization processing is completed. Therefore, the second virtual CAN driver 323 restarts the second storage processing, and the control task 300 restarts the second output processing. According to the above configuration, the second storage processing and the second output processing can be restarted according to the completion of the second initialization processing.

This example may be applied to the first embodiment. For example, when initializing the first buffer 313a, the first virtual CAN driver 313 sets the first initialization processing flag to True. The first virtual CAN driver 313 interrupts the first storage processing, and the control task 300 interrupts the first output processing. The first virtual CAN driver 313 sets the first initialization processing flag to False when the initialization of the first buffer 313a is completed. Therefore, the first virtual CAN driver 313 restarts the first storage processing, and the control task 300 restarts the first output processing.

Fifth Embodiment

Figure 17:
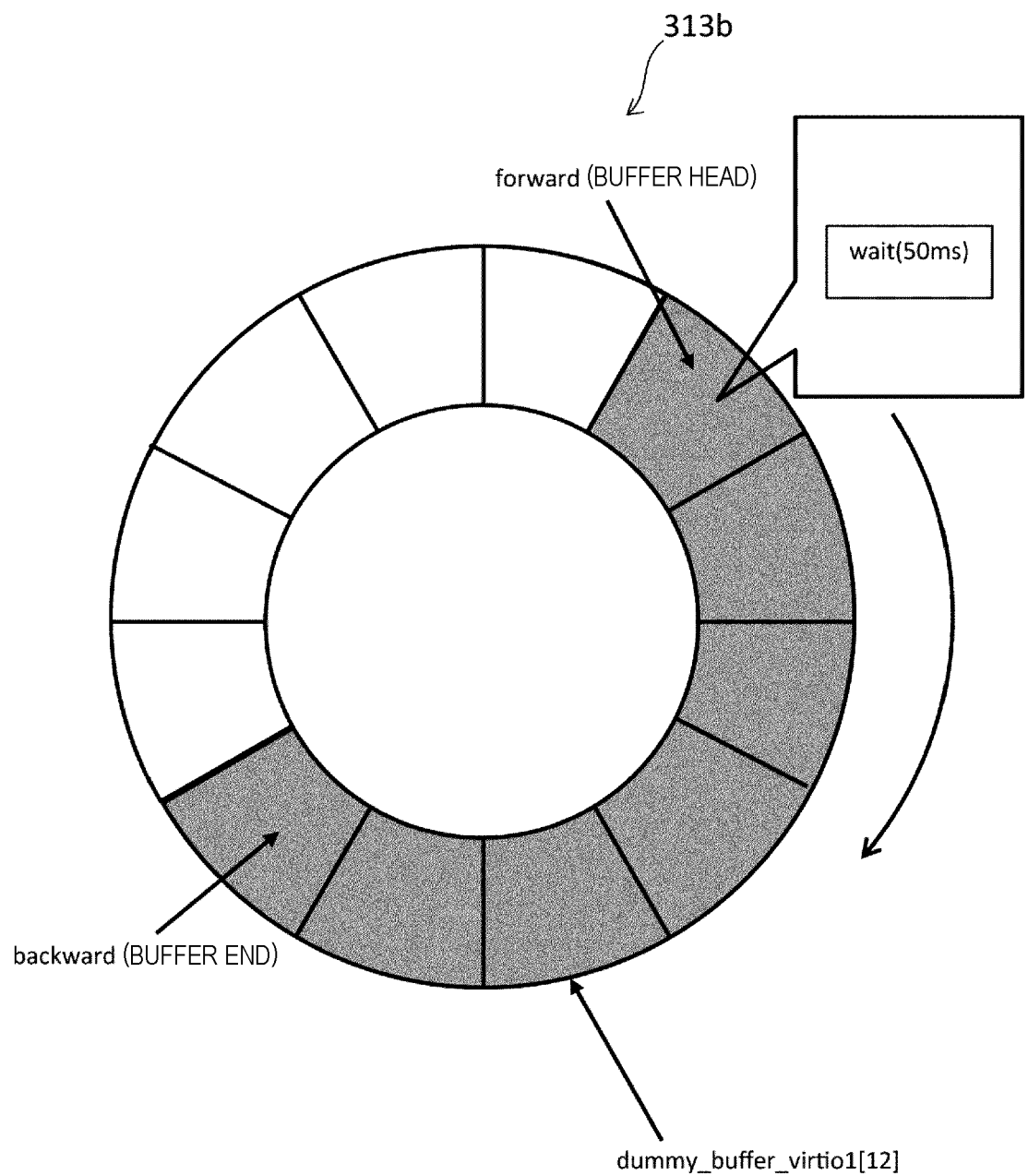
FIG. 17 is a diagram illustrating an example of a data structure of a first dummy buffer.

A configuration of the electronic control device 1000 in a fifth embodiment will be described. Hereinafter, differences from the first embodiment will be mainly described. In this example, the memory 3 further includes a first dummy buffer. FIG. 17 is a diagram illustrating a data structure of a first dummy buffer 313b. The first dummy buffer 313b has a ring buffer structure that is one of the implementations of the First-In-First-Out queue. Each element of the first dummy buffer 313b is a process of waiting for a predetermined time tm (so-called wait processing). The entity of the ring buffer is a structure array dummy_buffer_virtio1[12]. Here, for convenience of description, the number of elements of the array is 12, but the number of elements is not limited thereto.

The above time tm is an average value of processing times from a time point at which the first control software 310 calls CAN_send_virtio1 (ID, data) to a time point at which the CAN driver 302 stores the first peripheral transmission information 710 in the internal register 200b of the CAN controller 200a. In other words, the time tm is an average value of times until the first peripheral transmission information 710 arrives at the CAN controller 200a from the first control software 310. In a case where the average value of the above processing times is 50 ms, the time tm in the wait processing is set to 50 ms.

The first control software 310 transmits the first interruption command to the first virtual CAN driver 313 in the specific situation described above. The first virtual CAN driver 313 interrupts the first storage processing in response to the first interruption command. The first virtual CAN driver 313 initializes the first buffer 313a.

Here, the first virtual CAN driver 313 acquires the number of pieces of the first peripheral transmission information 710 stored in the first buffer 313a before initializing the first buffer 313a. That is, the first virtual CAN driver 313 acquires the number of elements of the array in which the first peripheral transmission information 710 is stored in the first buffer 313a. For example, it is assumed that the first peripheral transmission information 710 is stored in 7 elements among the 12 elements. In this case, the first virtual CAN driver 313 stores the same number of times of wait processing in the first dummy buffer 313b.

The first virtual CAN driver 313 stores 7 times of wait processing in the first dummy buffer 313b. As illustrated in FIG. 17, the first virtual CAN driver 313 stores wait processing in each of dummy_buffer_virtio1[0] to dummy_buffer_virtio1[6]. Further, the first virtual CAN driver 313 substitutes "0" for the index forward at the buffer front end and substitutes "6" for the index backward at the buffer back end.

The control task 300 retrieves data from the first dummy buffer 313b instead of the first buffer 313a in the specific situation. That is, the control task 300 extracts data (that is, wait processing) included in the index forward indicating the buffer head position of the first dummy buffer 313b, and executes wait processing. Then, the control task 300 computes the index forward as follows (forward←(forward+1) % 12). When the index forward is the array termination (forward=11), the control task 300 substitutes "0" for the index forward. Next, the control task 300 executes the second output processing.

In this manner, the control task 300 alternately extracts data from the first dummy buffer 313b and the second buffer 323a. That is, the control task 300 alternately executes the wait processing (50 ms waiting processing) and the second output processing.

Note that the first virtual CAN driver 313 may store the wait processing in the first dummy buffer 313b at a predetermined first period in a specific situation. As a result, the first virtual CAN driver 313 simulates a timing at which the first control software 310 calls CAN_send_virtio1 (ID, data). The first period in which the first virtual CAN driver 313 stores the wait processing is an average value of time intervals in which the first control software 310 calls CAN_send_virtio1 (ID, data). Note that the first period is not limited to a constant period, and may be a value calculated according to the Poisson probability process using an average value of the time intervals as a parameter.

Normally, the control task 300 alternately executes the first output processing and the second output processing. Therefore, the control task 300 executes the second output processing at a substantially constant cycle. On the other hand, in the first embodiment, since the control task 300 continuously executes the second output processing without executing the first output processing (see FIG. 11), the cycle in which the second output processing is executed becomes extremely short. According to the present example, since the control task 300 alternately executes the wait processing and the second output processing, the cycle in which the second output processing is executed is maintained at a constant cycle.

Sixth Embodiment

A configuration of the electronic control device 1000 in a sixth embodiment will be described. In the present example, the first control software 310 is software for controlling an engine in a hybrid electric vehicle (hereinafter referred to as "HEV"). For example, the first control software 310 is software for generating torque in the engine. The first control software 310 transmits information (opening amount of intake valve, fuel injection amount, ignition timing, and the like) related to the torque target value to be generated by the engine as the first peripheral transmission information 710.

The second control software 320 is software that controls a plurality of power sources (an engine and an inverter/motor) in the HEV. The second control software 320 transmits information regarding a torque target value to be generated in each of the engine and the inverter/motor as the second peripheral transmission information 720.

The HEV uses an engine as a power source for power generation and uses a motor as a power source for traveling. According to this example, software for engine control and software for HEV control are mounted on one microcomputer 900. Therefore, cost reduction can be realized.

Seventh Embodiment

A configuration of the electronic control device 1000 in a seventh embodiment will be described. In this example, the first control software 310 is software conforming to QM (Quality Management) according to the functional safety standard ISO 26262. The second control software 320 is software conforming to Automotive Safety Integrity Level (ASIL)-C.

Therefore, the safety standard required for the second control software 320 is higher than the safety standard required for the first control software 310. Even in the specific situation in which an abnormality related to the first control software 310 occurs, the second control software 320 having a higher safety standard can continue the transmission of the second peripheral transmission information 720 to the CAN controller 200a. Since an abnormality related to the first control software 310 does not affect the second control software 320, the electronic control device 1000 can realize a function of free from interference (FFI).

Eighth Embodiment

A configuration of the electronic control device 1000 in an eight embodiment will be described. In the specific situation, the second control software 320 may be configured to execute a part of the processing of the first control software 310 in addition to normal processing (transmission processing of the second peripheral transmission information 720). According to the above configuration, even when a specific situation occurs, the electronic control device 1000 can maintain processing of both the first control software 310 and the second control software 320.

For example, the first control software 310 is software that controls the engine as described above. As described above, the second control software 320 is software that controls the plurality of power sources (the engine and the inverter motor) in the HEV. In this case, the second control software 320 may further execute a part of the processing of the first control software 310 (output of information related to the torque target value to be generated by the engine) in the specific situation.

Ninth Embodiment

A configuration of the electronic control device 1000 in a ninth embodiment will be described. In a specific situation, the second control software 320 may degrade its own functionality. For example, the second control software 320 may change the content of the data of the second peripheral transmission information 720 or change the speed at which normal processing (transmission processing of the second peripheral transmission information 720) is executed. According to the above configuration, the possibility that the second control software 320 can continue the processing can be increased.

For example, the first control software 310 is software for controlling an engine, and the second control software 320 is software for controlling a plurality of power sources (an engine and an inverter motor) in the HEV. In this configuration, the second control software 320 may change the target value of the torque generated by the inverter/motor to a relatively small value in the specific situation, and cause the vehicle to travel with the minimum torque (that is, fail-safe traveling may be executed). According to this configuration, the vehicle in which an abnormality has occurred can be moved to a safe position.

Hitherto, the embodiments of the present invention have been described, but the invention is not limited to the embodiments. Various modifications may be made within a scope not departing from the spirit of the invention disclosed in claims. For example, the above-described embodiments of the invention have been described in detail in a clearly understandable way, and are not necessarily limited to those having all the described configurations. In addition, some of the configurations of a certain embodiment may be replaced with the configurations of the other embodiments, and the configurations of the other embodiments may be added to the configurations of the subject embodiment. In addition, some of the configurations of each embodiment may be omitted, replaced with other configurations, and added to other configurations.

REFERENCE SIGNS LIST 1000 electronic control device
1 CPU
2 peripheral
3 memory
4 bus
300 control task
301 main OS
302 CAN driver
310 first control software
311 first sub OS
312 first GPIO pin driver
313 first virtual CAN driver
313a first buffer
320 second control software
321 second sub OS
322 second GPIO pin driver
323 second virtual CAN driver
323a second buffer

The invention claimed is:

1. A vehicle control device comprising:
a memory storing first control software and second control software;
a CPU that executes the first control software and the second control software; and
a peripheral circuit used by the first control software and the second control software, wherein
the memory further includes a first buffer and a second buffer,
the CPU is configured to execute:
first storage processing of storing first peripheral transmission information in the first buffer, the first peripheral transmission information being transmission information from the first control software to the peripheral circuit;
second storage processing of storing second peripheral transmission information in the second buffer, the second peripheral transmission information being transmission information from the second control software to the peripheral circuit;
first output processing of outputting the first peripheral transmission information from the first buffer to the peripheral circuit; and
second output processing of outputting the second peripheral transmission information from the second buffer to the peripheral circuit, and
the CPU interrupts at least one of the first storage processing or the first output processing, in a specific situation where an abnormality related to the first control software has occurred, and
continues the second storage processing and the second output processing.

2. The vehicle control device according to claim 1, wherein
the CPU is configured to execute first initialization processing of initializing the first buffer in the specific situation.

3. The vehicle control device according to claim 2, wherein
the CPU is configured to further initialize software and hardware related to the first control software, in the first initialization processing.

4. The vehicle control device according to claim 2, wherein
the CPU is configured to restart the first storage processing and the first output processing after the first initialization processing is completed.

5. The vehicle control device according to claim 1, wherein
the memory further includes a first dummy buffer,
the first dummy buffer includes waiting processing of waiting for a predetermined time, and
the CPU is configured to alternately execute the waiting processing and the second output processing in the specific situation.

6. The vehicle control device according to claim 5, wherein
the predetermined time is an average value of times until the first peripheral transmission information arrives at the peripheral circuit from the first control software.

7. The vehicle control device according to claim 1, wherein
a safety standard required for the second control software is higher than a safety standard required for the first control software.

8. The vehicle control device according to claim 1, wherein
the second control software is configured to execute a part of processing of the first control software in the specific situation.

9. The vehicle control device according to claim 1, wherein
the first control software is software for controlling an engine in a hybrid electric vehicle, and
the second control software is software for controlling the engine and a motor in the hybrid electric vehicle.

10. The vehicle control device according to claim 1, wherein
the specific situation includes at least one of:
a situation in which the first control software executes exception handling other than normal processing;
a situation in which an abnormality has occurred in software related to the first control software; or
a situation in which an abnormality has occurred in hardware related to the first control software.

11. The vehicle control device according to claim 1, wherein
the CPU includes at least a first CPU core and a second CPU core,
the first CPU core is configured to execute the first control software, and
the second CPU core is configured to execute the second control software.

* * * * *